United States Patent [19]
Mon

[11] Patent Number: 4,724,701
[45] Date of Patent: Feb. 16, 1988

[54] FLUIDIC DISPLACEMENT SENSOR WITH LINEAR OUTPUT

[75] Inventor: George Mon, Potomac, Md.

[73] Assignee: The United States of America as represented by the Secretary of the Army, Washington, D.C.

[21] Appl. No.: 13,526

[22] Filed: Feb. 11, 1987

[51] Int. Cl.[4] .............................................. G01B 13/12
[52] U.S. Cl. ........................................................ 73/37.5
[58] Field of Search ........................ 73/37.5, 37.6, 37.7

[56] References Cited

U.S. PATENT DOCUMENTS

| 460,251 | 7/1886 | Mon | 73/506 |
|---|---|---|---|
| 3,371,517 | 3/1968 | Roth | 73/37.5 |
| 3,545,256 | 12/1970 | Beeken | 73/37.5 |
| 3,894,423 | 7/1975 | Messmer | 73/37.5 |
| 3,894,552 | 7/1975 | Bowditch | 73/37.5 X |
| 4,607,960 | 8/1986 | Wulff | 73/37.5 X |

FOREIGN PATENT DOCUMENTS

| 2237722 | 2/1974 | Fed. Rep. of Germany | 73/37.5 |
|---|---|---|---|
| 1358449 | 7/1974 | United Kingdom | 73/37.5 |
| 238171 | 7/1969 | U.S.S.R. | 73/37.5 |

Primary Examiner—Stewart J. Levy
Assistant Examiner—Joseph W. Roskos
Attorney, Agent, or Firm—Saul Elbaum; Guy M. Miller; Thomas F. McDonald

[57] ABSTRACT

An improved fluidic position sensor employs a housing having an axially aligned conduit and output orifice for discharging a jet of fluid. A sensing orifice is positioned adjacent to the output orifice for responding to a negative pressure entrainment area created by the discharged jet. The sensor measures the distance it is from an object by detecting changes in negative pressure at the sensing orifice. A standoff protrudes from the sensor at a distance to keep the sensor operating in substantially a linear range.

6 Claims, 5 Drawing Figures

FLUIDIC DISPLACEMENT SENSOR WITH LINEAR OUTPUT

RIGHTS OF THE GOVERNMENT

The invention described herein may be manufactured, used and licensed by or for the U.S. Government for Governmental purposes without payment to me of any royalty thereon.

BACKGROUND OF THE INVENTION

1. Field of the Invention

The present invention relates generally to position sensors and more particularly to fluidic position sensors.

2. Description of the Prior Art

Prior art position or object sensors sense the position of objects by discharging a jet of fluid towards an object which creates back pressure in the jet stream. Pressure transducers are used to measure this back pressure, at an outlet port in the position sensor, as a function of the distance the position sensor is from the object. This type of position sensor, however, has some major drawbacks in its operating capabilities. Because the sensor uses back pressure to sense the object, the output developed at the outlet port is highly nonlinear. The sensor also has a very limited operating range due to the proximity the sensor must attain in approaching an object before the backpressrue signal develops.

SUMMARY OF THE INVENTION

It is therefore an object of this invention to extend the operating range of fluidic displacement sensors.

It is a further object of this invention to produce a more linear response within the operating range of fluidic displacement sensors.

The foregoing and other objects are obtained in accordance with the present invention through the provision of a sensing orifice placed adjacent to a discharge orifice or nozzle of the position sensor.

A negative pressure is developed at the sensing orifice due to an entrainment effect caused by fluid being discharged from the nozzle. For a given supply pressure, the fluid discharged from the nozzle entrains fluid from its surroundings. This entrainment phenomena results in a negative pressure at the sensing orifice. As the position sensor moves closer towards an object to be sensed, the amount of entrainment changes, resulting in a change in pressure at the sensing orifice. The new pressure represents the distance the pressure sensor is from the object. The placing of a sensing orifice on a fluidic displacement sensor in this manner results in a device that has an extended operating range and has a more linear response within this extended range.

The above and other objects, features, and advantages of the present invention will be better understood from the following detailed description taken in conjunction with the accompanying drawings.

DESCRIPTION OF THE PREFERRED EMBODIMENTS

Figure 1:
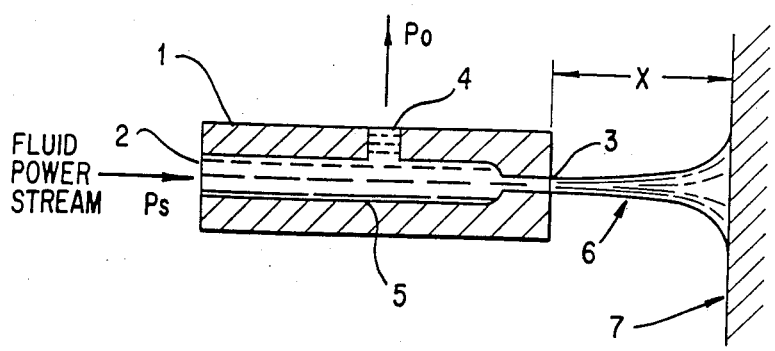
FIG. 1 shows a fluidic displacement sensor of the prior art.
Figure 2:
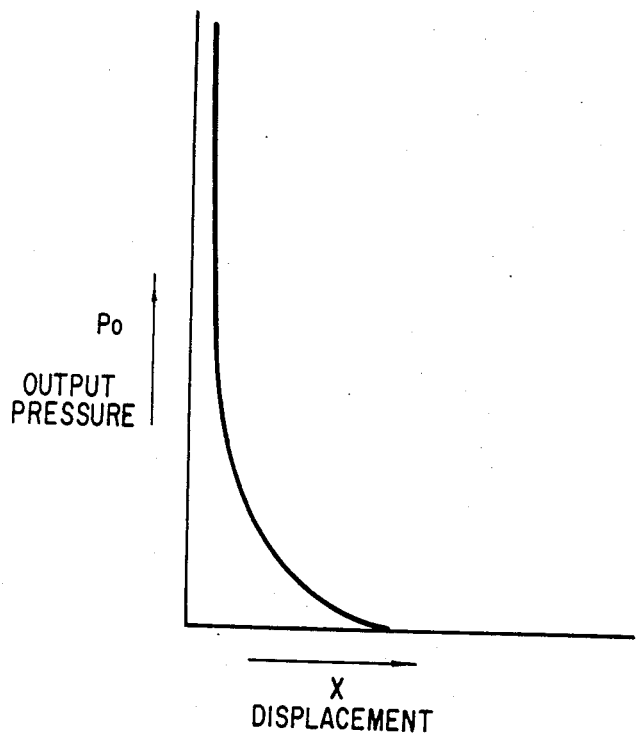
FIG. 2 shows a response curve of a prior art fluidic displacement sensor.

FIG. 1 shows a prior art fluidic displacement sensor 1 having an inlet orifice 2 a discharge orifice or nozzle 3 and output orifice 4. A fluid power stream at a supply pressure $P_S$, enters the inlet orifice 2 travels through a conduit 5 and is discharged from the nozzle 3 forming a jet 6. As the sensor 1 approaches a sensing object 7, by a displacement X, back pressure increases, thus increasing output pressure $P_0$ at the output orifice 4. FIG. 2 shows the response (output pressure $P_0$ versus displacement X) of this type of sensor. As can be seen from this response, as the displacement decreases the output pressure $P_0$ increases dramatically in a very short distance. The response is also very nonlinear.

Figure 3:
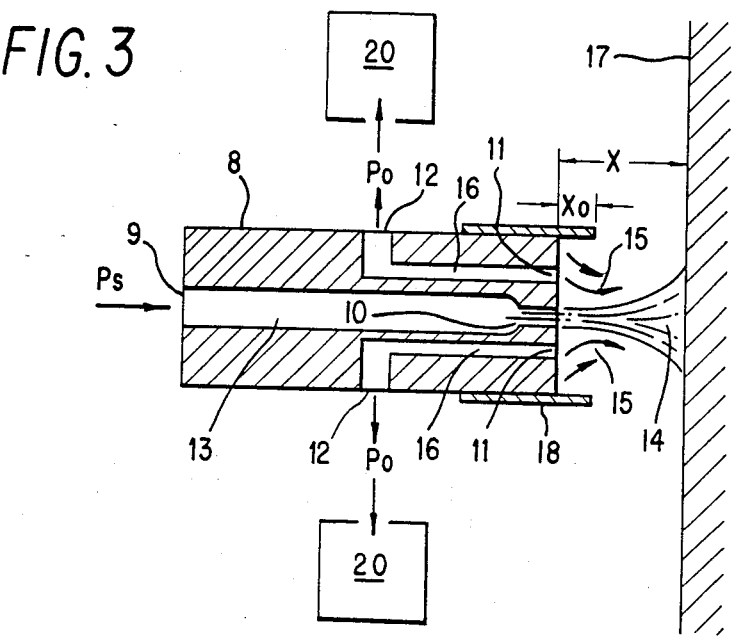
FIG. 3 shows a fluidic displacement sensor incorporating the principles of the present invention.

FIG. 3 shows a fluidic displacement sensor 8 having an inlet orifice 9, a discharge orifice or nozzle 10, a sensing orifice 11 and an outlet orifice 12. A fluidic power stream enters the inlet orifice 9, is conveyed through a conduit 13 and is discharged from the nozzle 10 forming a jet 14.

Figure 5:
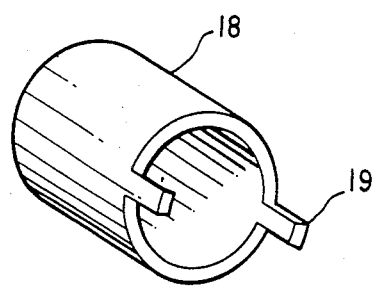
FIG. 5 shows a standoff in accordance with the present invention.
Figure 4:
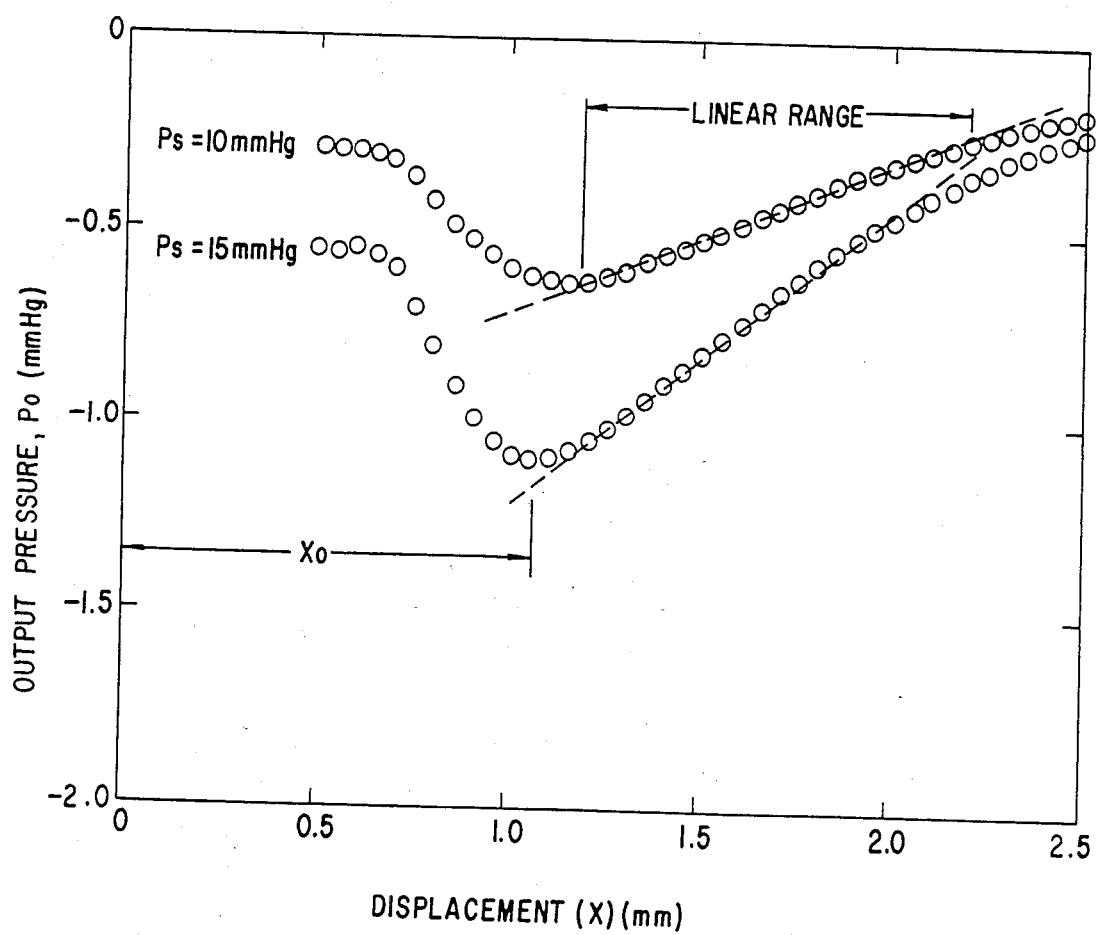
FIG. 4 shows typical plots of the output pressure as a function of displacement sensors in accordance with the present invention.

The fluid jet 14, discharged from the sensor 8, creates an entrainment area 15 which sets up a negative pressure at sensing orifice 11. The negative pressure developed at the sensing orifice 11 is transmitted to the outlet orifice 12 through a sensing conduit 16. As the sensor 8 approaches a sensing object 17 the amount of entrainment changes, developing a different negative pressure at the sensing orifice 11 and outlet orifice 12. Any of a number of well known pressure transducers, 20, may be used to measure the output pressure $P_0$ developed at the outlet orifice 12. The output pressure $P_0$ is also of a sufficient magnitude to enable a particular pressure sensor to measure the output pressure $P_0$ without the need for amplification. Examples of typical responses with this type of displacement sensor using a nozzle width of 1/32 inch are shown in FIG. 4. Each curve demonstrates a different supply pressure $P_S$. As seen in FIG. 4. as the displacement X decreases the output pressure signal $P_0$ becomes more negative in a linear fashion. At a certain displacement, however, the output pressure signal $P_0$ reaches a maximum negative value and then starts to become less negative. Note that this sensor has a linear operating range and that this linear range is about 4 times that of the entire operating range of the conventional sensor. As the displacement X continues to decrease the output pressure signal $P_0$ becomes less and less negative. This response creates a problem because there is one output pressure signal for two separate displacements over a certain range. One way to correct this problem is to use a standoff 18, as shown in FIG. 3, attached to the sensor 8 to limit the distance the sensing orifice 11 may approach a sensing object 17. The amount of protrusion $X_0$ is determined by the distance at which the output pressure $P_0$ reaches its maximum negative value as shown in FIG. 4. If the supply pressure is changed the standoff length must be changed accordingly to give the proper protrusion. The standoff must also be of a construction that does not interfere with the entrainment pnenomena. FIG. 5 shows an example of a stand off sleeve 18 that fits snugly around the sensor with protrusions 19 that extend out from the sensor a distance of $X_0$. The use of small protrusions have a minimal affect on the entrainment process.

The supply pressure and nozzle width are factors influencing the distance at which the sensor may operate. A stronger supply pressure and large nozzle opening will generally result in a larger range of distances that may be sensed. The sensing orifice 11 must be close enough to the outlet orifice 10 in order to be affected by the entrainment area 14. The edge of the sensing orifice 11 should be about one to two nozzle widths away from the edge of the nozzle 10. If the sensing orifice 11 is placed too close to the nozzle 10 an undesirable signal is generated. The sensing orifice 11 should also generally be on the order of the same size as the nozzle 10. By using more than one sensing orifice placed equal distance around the nozzle a faster response will result.

Obviously, numerous modifications and variation of the present invention are possible in light of the above teachings. It is therefore to be understood that within the scope of the appended claims, the invention may be practiced than as specifically described herein.

What is claimed is:

1. A fluidic position sensor comprising:
   a housing having an axially aligned conduit for receiving a fluid power stream and an output orifice formed in one end of said housing in axial alignment and communication with said conduit for discharging said fluid power stream from said housing in the form of a jet of fluid, said jet of fluid creating an annular entrainment area of negative pressure concentric with and adjacent to said output orifice, said housing having a sensing orifice formed therein and positioned between about one to two output orifice widths away from the edge of said output orifice for responding to the negative pressure entrainment area created by said jet;

standoff means attached to said housing, protruding from said one end of said housing a distance that allows the negative pressure developed at said sensing orifice to increase to a maximum negative value, as said standoff means approaches an object, and prevents the negative pressure from decreasing once the pressure has reached its maximum negative value, by coming in contact with the object; and means for measuring the negative pressure generated at said sensing orifice as a function of the distance between said standoff means and the object; whereby the negative pressure developed at said sensing orifice, and measured by said measuring means, remains in substantially a linear range, as the position sensor approaches the objects.

2. A fluidic position sensor according to claim 1 wherein said output orifice has a diameter of about 1/32 inch to ⅛ inch.

3. A fluidic position sensor according to claim 2 wherein said output orifice has a smaller cross sectional area that said sensing orifice.

4. A fluidic position sensor according to claim 1 wherein said housing has a plurality of sensing orifices formed therein concentrically positioned and equally spaced around said output orifice for responding to the negative pressure entrainment area created by said jet.

5. A fluidic position sensor according to claim 4 wherein said plurality of output orifices have a diameter of about 1/32 to ⅛ inch.

6. A fluidic position sensor according to claim 4 wherein said output orifice has a smaller cross sectional area than said sensing orifices.

* * * * *